Patented Sept. 8, 1936

2,053,280

UNITED STATES PATENT OFFICE 2,053,280

PRODUCTION OF CELLULOSE DERIVATIVES

Robert E. Fothergill and Joseph F. Haskins, Wilmington, Del., assignors to E. I. du Pont de Nemours & Company, Wilmington, Del., a corporation of Delaware No Drawing. Application August 1, 1933, Serial No. 683,170

11 Claims. (Cl. 260—101)

This invention relates to the production of cellulose derivatives and, more particularly, relates to a process of acetylating partially substituted celluloses by means of ketene.

Heretofore various processes have been disclosed for the acetylation of cellulose with ketene. Such processes are shown in United States Patent 1,685,220 to E. B. Middleton, United States Patent 1,604,471 to D. A. Nightingale and United States Patent 1,816,564 to L. M. Burghart. These patents do not show the production of mixed cellulose esters nor of cellulose ether esters. Although cellulose acetate can be produced according to the Nightingale process, the reaction requires such a long time to gain complete acetylation that this process is extremely uneconomical for use on a commercial scale.

An object of the present invention is to provide a simple and economical process for producing mixed cellulose esters or cellulose ether-esters by means of ketene. A further object is to provide an economical and relatively rapid method of acetylating partially substituted celluloses to give products of improved properties. A further object is to provide a simple and economical process for producing cellulose acetate of high quality. Other objects of the invention will be apparent from the description given hereinafter.

The above objects are accomplished according to the present invention by acetylating a partially substituted cellulose by contacting same with ketene, preferably in the presence of a catalyst and an inert liquid. In a preferred more specific form the invention comprises suspending a partially substituted cellulose in an inert solvent for the product to be produced and in the presence of a catalyst, preferably perchloric acid, and passing ketene into this suspension.

The following examples, wherein the quantities of materials are expressed as parts by weight, are given to illustrate specific embodiments of the invention:—

*Example 1.*—Twenty-five parts of cellulose monoacetate (prepared by treating cotton linter pulp with acetic anhydride in the presence of pyridine, pyridine hydrochloride and dioxan as disclosed in U. S. Patent No. 1,990,483 of February 12, 1935) is mixed thoroughly with a suspension of 0.18 part of 70% perchloric acid in 400 parts of chloroform in a suitable reaction container. After 10 minutes ketene is passed into the reaction flask at a rate of about 1 part per minute for a period of 30 minutes with rapid stirring. The temperature of the reaction mass rises in 10 to 15 minutes to a maximum of about 45–50° C. where it remains for the remainder of the reaction period. At the end of 30 minutes reaction the cellulose is completely acetylated and a clear brown solution of good viscosity is formed. To this esterification solution is added 100 parts of 91% acetic acid to stop acetylation and then a mixture of 200 parts of glacial acetic acid, 20 parts of water, and 1.5 parts of concentrated sulfuric acid is mixed in uniformly. This solution is allowed to stand at 40° C. until the acetate has been hydrolyzed to the desired acetyl content. About 74 hours are required to produce a cellulose acetate containing 53% combined acetic acid. At the end of the hydrolysis an amount of sodium acetate slightly in excess of that equivalent to all the catalyst is mixed in thoroughly and the solution is poured into boiling water to precipitate the cellulose acetate and vaporize the chloroform. The chloroform may be recovered by any suitable means. The precipitated cellulose acetate is washed acid free and dried at 65° C. This acetone soluble cellulose acetate forms films of excellent flexibility.

*Example 2.*—An ethyl cellulose acetate is prepared in a manner similar to that described in Example 1 by acetylating a suspension of 23.5 parts of ethyl cellulose which contains one ethyl group for each three glucose units, in 400 parts of chloroform and 0.36 part of 70% perchloric acid. When ketene is passed itno the reaction flask at the rate of 1 part per minute, the temperature of the reaction mass rises during 15 minutes to 45–50° C. and after another 15 minutes at this temperature, a viscous brown solution is obtained which is practically free of fibers. The primary ester which is formed is soluble in chloroform but only partially soluble in acetone and may be precipitated at this stage by pouring the esterification solution into hot water. If a partially hydrolyzed ester is desired, the primary ester may be hydrolyzed by the method described in Example 1.

*Example 3.*—A cellulose acetate-propionate is obtained by treating 26 parts of a cellulose propionate containing 22.8% combined propionic acid (made by treating cotton linters with propionic anhydride in pyridine, pyridine hydrochloride and dioxan) suspended in 400 parts of chloroform and 0.36 part of 70% perchloric acid with ketene in the manner described in Example 1. A clear brown solution is obtained in about 30 minutes and the primary ester may be precipitated at this stage if a chloroform soluble product is desired. An acetone soluble cellulose acetate-propionate may be obtained by partially hydrolyzing the primary ester by the method described in Example 1.

*Example 4.*—A cellulose acetate of extremely high viscosity in acetone is obtained by acetylating 25 parts of a partially substituted cellulose acetate, containing 34.2% combined acetic acid (prepared by treating cotton linter pulp with acetic anhydride in the presence of pyridine, pyridine hydrochloride and dioxan), suspended in a solution of 0.18 part of perchloric acid in 600 parts of methylene chloride with ketene in a manner similar to that described in Example 1. The temperature of the reaction mass rises to about 30–35° C. in a few minutes and after 1.3 hours at this temperature a very viscous, slightly grainy solution is obtained. One hundred parts of 91% acetic acid is added to stop the acetylation and, after thoroughly mixing a solution of 17.5 parts of water and 2.4 parts of sulfuric acid in 200 parts of acetic acid, the primary acetate is hydrolyzed for 125 hours at 30° C. The resulting acetate contains 53.6% acetic acid, forms a very viscous solution in acetone and forms films that are extremely flexible.

The above examples merely illustrate specific embodiments of the invention which broadly comprises acetylating a partially substituted cellulose by contacting same with ketene in the presence of a catalyst and an inert liquid. The process is applicable in general to partially substituted celluloses, but all partially substituted celluloses are not capable of being used in the process with the same degree of satisfaction. The three substituted celluloses set forth in the specific examples are particularly well adapted for use in the process, as are cellulose esters containing higher aliphatic acid radicals and cellulose ethers containing higher alkyl groups. A low cellulose formate is more slowly acetylated than the corresponding acetate, and cellulose nitrate, methyl cellulose, benzyl cellulose, and cellulose glycolic acid of a low degree of substitution are relatively slowly and non-uniformly acetylated.

The degree of substitution of these partially substituted celluloses may vary over wide limits and still be adapted for use in the process of the present invention. By the term "partially substituted cellulose" as used herein is meant a cellulose containing at least one acyl or alkyl group for four glucose units as the lower limit, and any substituted cellulose containing reactive hydroxyl groups as the upper limit. Preferably a partially substituted cellulose containing at least ¼, and not more than 1½, acyl or alkyl group for each glucose unit is employed. Where a partially substituted cellulose having a lower degree of substitution than one acyl or alkyl group for four glucose units is used, the acetylation is not uniform.

The particular manner of preparing the partially substituted cellulose influences the rate at which the cellulose is acetylated with ketene. For example, a cellulose acetate containing 0.43 acetyl group for each glucose unit made by acetylating cellulose with acetic anhydride in the presence of benzene and acetic acid and with perchloric acid as the catalyst, is acetylated with poor uniformity, whereas a cellulose acetate containing only 0.3 acetyl group for each glucose unit, but made by pretreating cotton linters with acetic anhydride in the presence of pyridine, pyridine hydrochloride and dioxan, is acetylated very rapidly and uniformly. Also a glycol cellulose made in the presence of dimethyl anilin is more readily acetylated than a glycol cellulose of a similar degree of substitution made from alkali cellulose and ethylene oxide. The rapidity, uniformity, and degree of acetylation is dependent upon the degree to which the partially substituted cellulose is swollen by the inert liquid, since a cellulose sufficiently swollen can be penetrated uniformly and rapidly by ketene and the catalyst.

As the catalyst in this reaction, perchloric acid is markedly superior to other catalysts tried. However, perbromic and periodic acid are satisfactory catalysts, as well as sulfuric acid, zinc chloride, sulfuryl chloride, and ethylchlorosulfonate. Other known catalysts of this type may also be employed with varying degrees of success. Both sulfuryl chloride and ethylchlorosulfonate, when employed in relatively large amounts such as 50–100% by weight of the cellulose, can be used quite effectively.

The reaction is carried out in the presence of an inert liquid which may or may not be a solvent for the product to be obtained. For example, benzene, toluene, or carbon tetrachloride may be used in the present process although they are not solvents for the product to be obtained. However, it is preferred to use an inert liquid which is a solvent for the end product, and of these inert liquids, the chlorinated hydrocarbons are preferred, particularly the chlorinated lower aliphatic hydrocarbons. Chloroform is believed to be the most satisfactory solvent, although methylene chloride may also be used with excellent results, except that the esterification solutions are not quite as clear and uniform as when chloroform is used. Acetylation in the presence of ethylene dichloride, trichloroethylene, dichloroethylene, and dioxan gives esterification solutions which are more grainy and fibrous than when methylene chloride is employed, but nevertheless these solvents are useful, and under certain conditions, may be found to be particularly advantageous.

It will be understood that the present invention is by no means limited to the exact manner of procedure set forth in the specific examples. The temperature of the reaction mixture may be controlled by external means and, on large scale acetylation, this external temperature control is quite necessary. The temperature of acetylation may be held constant, say at 30° C., or at any other temperature between 0° C. and 50° C., depending on the concentration of catalyst used in the acetylating bath. The temperature may also be held at 15–20° C. during the first part of the acetylation and then gradually raised to a maximum of 60° or lower, preferably 40–50° C., and held at this temperature until complete acetylation has taken place. As those skilled in the art will appreciate, a longer time of acetylation will be required when the reaction is conducted at lower temperatures, but that the temperatures may be varied considerably.

The ketene used in the process may be prepared by any known method and used immediately after its formation. It need not be pure ketene, and in the usual practice, it will not be chemically pure since ketene is generally obtained by cracking acetone, which gives a mixture of several gases, including methane and hydrogen. The ketene gas may be passed through the reaction mixture at a rate such that only a small excess over that theoretically required to form a triacetate is introduced by the end of the acetylation time, or a large excess may be used. Also the acetylation may be carried out in a closed container under pressure by introducing the desired amount of ketene into the reaction mixture, at a low temperature and then allowing the acetylation to proceed at the desired temperature and corresponding pressure with suitable agitation.

The exact optimum proportion of catalyst to be used in the process will vary considerably as different catalysts are used and conditions of operations are changed. In general, at least an amount of catalyst equal to 0.3% by weight based on the partially substituted cellulose should be employed. Using perchloric acid, the amount of catalyst may range between 0.3% to 2.5% by weight of the cellulose, preferably between 0.5% to 1.8%. With other catalysts, such as sulfuryl chloride and ethylchlorosulfonate, as much as 100% by weight based on the cellulose has proved advantageous. As will be understood by those skilled in the art, the proportion of catalyst under any particular set of conditions is best determined by actual trial, although the above proportions may be taken as an approximate guide, thereby reducing preliminary experimentation to determine the optimum proportion to a minimum.

The process of the present invention is, of course, not limited to any particular method of hydrolysis and precipitation of the acetylated cellulose such as described in the examples. Any of the other known methods may be used to precipitate or hydrolyze the primary cellulose esters produced by this process.

The cellulose esters produced according to this process are particularly suitable for use in plastics and films and also for use in any other manner in which cellulose acetate or other cellulose esters are now used. For example, they may be used in lacquers and other coating compositions, artificial bristles or fibers, and the like.

The present invention provides an improved process for preparing cellulose acetate or mixed cellulose esters or ether-esters containing acetyl by the use of ketene. Previous methods which have been proposed for the acetylation of cellulose with ketene in the presence of inert solvents or diluents and in the absence of organic acids and anhydrides require an extremely long time to obtain complete acetylation. For example, if dry cellulose is acetylated by means of ketene in the presence of perchloric acid and chloroform, less than 4% acetic acid is introduced in a two hour acetylation under the same conditions of temperature and catalyst concentration, et cetera, as are required to fully acetylate a low cellulose acetate or a low ethyl cellulose in ½ to ¾ of an hour. It will be seen from this that the present process has a material and distinct advantage over heretofore known processes of acetylating dry cellulose with ketene, and that the fact that a partially substituted cellulose is employed according to the present process results in a quite unexpectedly rapid and uniform acetylation.

Tests have shown that the specific combination of perchloric acid with solvents such as chloroform or methylene chloride is appreciably more effective in the present process than other catalysts-solvents combinations. With other combinations the acetylation proceeds more slowly and less uniformly.

A distinct advantage of the present invention is that the products prepared in accordance therewith are of improved quality. Unplasticized films of cellulose acetates prepared in accordance with this invention have been found to be materially more flexible than cellulose acetates prepared by ordinary methods. It is believed that this improved quality is due to the fact that the acetylation is conducted in the presence of a strong acid catalyst for a much shorter time than in the ordinary acetylating process and that the cellulose molecule is therefore degraded to a much smaller extent.

The present invention is quite different from that disclosed in the heretofore mentioned Middleton patent. In the latter patent, the presence of acetic acid is required; this indicates that the reaction proceeds through the intermediate formation of acetic anhydride. In the present invention an organic carboxylic acid is not used but only ketene and the partially substituted derivative (preferably with a catalyst and a diluent); hence the mechanism of the present reaction can only be one of direct esterification with the ketene. In the process disclosed in the Nightingale patent acetic acid may or may not be used. Without acetic acid, acetylation of a dry cellulose is almost negligible, and with a wet cellulose such acetylation as does take place is through the intermediate formation of acetic anhydride and the process is essentially that of Middleton.

In a copending application by George D. Graves (Serial No. 667,041, filed April 20, 1933), claim is made to the preparation of cellulose mixed esters, the acid radicals of which comprise acetyl, from unsubstituted cellulose, ketene and an organic acid other than acetic acid. The present invention deals with the preparation among other compositions of mixed cellulose esters from ketene and the partially esterified cellulose. The processes of the two applications are quite different. In the Graves application, the mixed esters are obtained through the intermediate formation of a mixed anhydride. In the present invention, the partially esterified cellulose is further esterified by direct action of ketene. The Graves application, moreover, is not concerned with catalysts, the use of which is an important feature of the present invention.

As many apparently widely different embodiments of this invention may be made without departing from the spirit and scope thereof, it is to be understood that the invention is not limited to the specific embodiments thereof except as defined in the appended claims.

We claim:

1. Process which comprises acetylating a cellulose derivative of the class consisting of partially substituted cellulose ethers and esters by contacting the same with ketene as essentially the sole acetylating agent said cellulose derivative being prepared by the replacement of cellulosic hydroxyl hydrogen by a substituting group in the presence of a tertiary amine.

2. Process of claim 1 characterized by the use of a catalyst.

3. Process of claim 1 characterized by the use of an inert liquid.

4. Process which comprises acetylating a cellulose derivative of the class consisting of partially substituted cellulose ethers and esters in the presence of perchloric acid and a chlorinated lower aliphatic hydrocarbon by contacting the same with ketene as essentially the sole acetylating agent said cellulose derivative being prepared by the replacement of cellulosic hydroxyl hydrogen by a substituting group in the presence of a tertiary amine.

5. Process which comprises acetylating a partially substituted cellulose ester by contacting the same with ketene as essentially the sole acetylating agent in the presence of perchloric acid, as a catalyst, and chloroform said ester being prepared by esterifying cellulose in the presence of a tertiary amine.

6. Process which comprises acetylating a cellulose acetate containing from ¼ to 1½ acetyl groups for each glucose unit by contacting the same with ketene as essentially the sole acetylating agent in the presence of perchloric acid and a chlorinated lower aliphatic hydrocarbon said cellulose acetate being prepared by acetylating cellulose in the presence of a tertiary amine.

7. Process which comprises acetylating an ethyl cellulose containing from ¼ to 1½ ethoxy groups for each glucose unit by contacting the same with ketene as essentially the sole acetylating agent in the presence of perchloric acid and a chlorinated lower aliphatic hydrocarbon said ethyl cellulose being prepared by ethylating cellulose in the presence of a tertiary amine.

8. Process which comprises acetylating a cellulose propionate containing from ¼ to 1½ propionyl groups for each glucose unit by contacting the same with ketene as essentially the sole acetylating agent in the presence of perchloric acid and a chlorinated lower aliphatic hydrocarbon said cellulose propionate being prepared by propionating cellulose in the presence of a tertiary amine.

9. Process which comprises acetylating a partially substituted cellulose acetate by contacting the same with ketene as essentially the sole acetylating agent in the presence of a catalyst and an inert liquid, said partially substituted cellulose being prepared by reacting cellulose, acetic anhydride, a tertiary amine, and a tertiary amine hydrochloride.

10. The process which comprises acetylating a partially substituted cellulose ester by contacting the same with ketene as essentially the sole acetylating agent, the said cellulose derivative being prepared by the replacement of cellulosic hydroxyl hydrogen by a substituting group in the presence of a tertiary amine.

11. The process which comprises acetylating a partially substituted cellulose ether by contacting the same with ketene as essentially the sole acetylating agent, the said cellulose derivative being prepared by the replacement of cellulosic hydroxyl hydrogen by a substituting group in the presence of a tertiary amine.

ROBERT E. FOTHERGILL.
JOSEPH F. HASKINS.